United States Patent [19]

Ng

[11] Patent Number: 5,937,147
[45] Date of Patent: Aug. 10, 1999

[54] PRINTING OF ENHANCED IMAGES

[75] Inventor: Yee Seung Ng, Fairport, N.Y.

[73] Assignee: Eastman Kodak Company, Rochester, N.Y.

[21] Appl. No.: 08/708,272

[22] Filed: Sep. 3, 1996

[51] Int. Cl.$^6$ .................................................. G06K 15/00
[52] U.S. Cl. ............................................ 395/109; 395/102
[58] Field of Search ..................................... 395/101, 102, 395/109; 382/237, 298, 299; 358/298, 451, 455

[56] References Cited

U.S. PATENT DOCUMENTS

| | | |
|---|---|---|
| 4,746,941 | 5/1988 | Pham et al. . |
| 4,750,010 | 6/1988 | Ayers et al. . |
| 4,843,630 | 6/1989 | Catros et al. . |
| 4,882,686 | 11/1989 | Gretter . |
| 5,005,139 | 4/1991 | Tung . |
| 5,047,955 | 9/1991 | Shope et al. . |
| 5,185,852 | 2/1993 | Mayer ....................................... 395/109 |
| 5,300,960 | 4/1994 | Pham et al. . |
| 5,392,137 | 2/1995 | Okubo . |
| 5,450,531 | 9/1995 | Ng et al. . |
| 5,455,681 | 10/1995 | Ng . |
| 5,483,605 | 1/1996 | Rostamian . |
| 5,502,793 | 3/1996 | Ng . |
| 5,579,451 | 11/1996 | Suzuki . |
| 5,600,761 | 2/1997 | Ng et al. . |
| 5,687,296 | 11/1997 | Shimada . |
| 5,687,297 | 11/1997 | Coonan et al. . |
| 5,739,841 | 4/1998 | Ng et al. . |
| 5,751,470 | 5/1998 | Damon ..................................... 358/298 |

FOREIGN PATENT DOCUMENTS

WO 94/13098  6/1994  WIPO .

OTHER PUBLICATIONS

U.S. application No. 08/581,025, Fleming et al, entitled: Led Printhead and Driver Chip for Use Therewith Having Boundary Scan Test Architecture.
Article entitled: "Image Makers" by Henry Bortman MacUser, Nov. 1991, pp. 98–103.
U.S. application No. 08/276,063.
U.S. application No. 08/175,079.
WO 94/13098.
U.S. application No. 08/469,166.

*Primary Examiner*—Arthur G. Evans
*Attorney, Agent, or Firm*—Norman Rushefsky

[57] ABSTRACT

A problem of mismatch in pixel resolution between a front-end device, at one relatively low pixel resolution, and an output device such as a non-impact printer or a display at a higher pixel resolution is overcome by providing for grey level enhancement of low pixel resolution binary image data to minimize jaggies in a printed or displayed image, and then increasing the pixel resolution of the grey level enhanced image data to match that of the output device.

13 Claims, 2 Drawing Sheets

PRINTING OF ENHANCED IMAGES

CROSS-REFERENCE TO RELATED APPLICATION

This application is related to commonly assigned U.S. application Ser. No. 08/706,953, filed on even date herewith in the names of Yee S. Ng et al and entitled "Resolution Enhancement System for Digital Images."

BACKGROUND OF THE INVENTION

1. Field of the Invention

This invention relates to non-impact printing and more particularly, to a method and apparatus for printing images with enhanced image formation even though there is a mismatch in resolution, i.e. dots per inch resolution, between input image data and writer capability.

2. Description of the Prior Art

In U.S. Pat. No. 5,047,955, and U.S. application Ser. No. 08/276,063 and now U.S. Pat. No. 5,623,585, there are disclosed copier/printers wherein data may be input from either a document scanner or an electronic image information source such as a word processor, computer, electronic data reader, etc. In order to print the data using a non-impact printer, such as an LED printer, laser writer, ink jet device, etc., the data, after rasterization and/or other front-end image processing, may be stored in a buffer and output to the printer as needed. To reduce the requirements for storage and facilitate the production of plural copy sets of multiple-page documents, the rasterized data may be compressed and stored in a buffer memory forming a part of a job image buffer (JIB). When needed, the data may be output to the printhead either directly or through certain post-processing devices which serve to either correct for non-uniformities of the recording elements (if multiple recording elements are used), or to provide gamma correction to correct for the particular printer characteristics.

In order to improve upon the appearance of the images produced by such copier/printers, it has been recognized that in comparing printers, all other things being equal, higher pixel resolutions generally provide for better appearing images. It has therefore been one objective of manufacturers of non-impact printheads to increase pixel resolution of such products. A problem that arises is that existing front end devices, such as document scanners and printer servers storing data in page description languages, e.g. "Postscript" a trademark of Adobe, Inc., associated with image data from an electronic source of same and JIBs are either widely used or available in a lower resolution capability than that of the new printheads.

It is therefore an object of the invention to provide a non-impact printing apparatus and method wherein enhanced images can be printed even though there is a mismatch between the pixel resolution of the data forming an input to a marking engine and the writer or printhead.

SUMMARY OF THE INVENTION

In accordance with the invention, there is provided an image-processing apparatus comprising first means for outputting first binary image data at a relatively low pixel resolution; second means for generating grey level enhanced binary image data at the low pixel resolution wherein certain binary pixels are converted to grey level pixels at the low resolution; and third means for increasing the pixel resolution of the grey level enhanced binary image data to match that of an output device. In accordance with another aspect of the invention, there is provided an image-processing method comprising providing first binary image data at a relatively low pixel resolution; generating grey level enhanced binary image data at the low pixel resolution wherein certain binary pixels are converted to grey level pixels at the low resolution; and increasing the resolution of the grey level enhanced image data to match that of an output device.

BRIEF DESCRIPTION OF THE DRAWINGS

With the above as background, reference should now be made to the following description of the best mode for carrying out the invention and the accompanying drawings, wherein.

DESCRIPTION OF THE PREFERRED EMBODIMENTS

Because apparatus of the type described herein are well known, the present description will be directed in particular to elements forming part of or cooperating more directly with the present invention.

Figure 1:
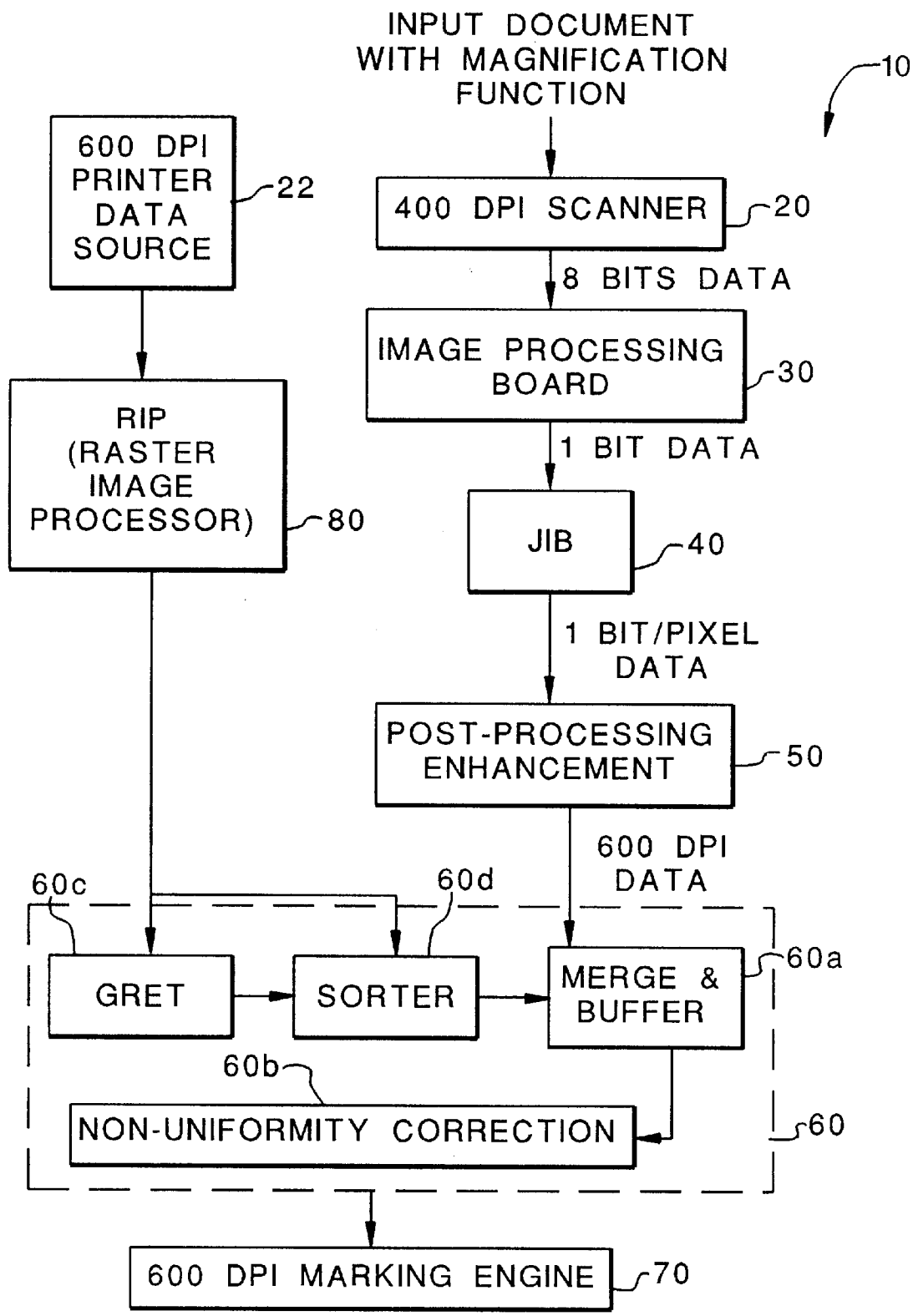
FIG. 1 is a block diagram of a copier/printer apparatus in accordance with one aspect of the invention.

With reference now to the drawings, there is shown in FIG. 1 a copier/printer apparatus 10 which includes image data inputs from either a document scanner 20 or a source 22 of electronic image information. Assume in the example of FIG. 1 that the electronic image source is input at a pixel resolution of 600 dots per inch (dpi) to a raster image processor (RIP) 80 and output therefrom to a writer interface 60 which includes a buffer for storing one or more lines of image data for output to a marking engine 70 which, in this example, includes a printhead that is also operable at 600 dpi. The printhead preferably takes the form of an LED printhead which comprises chip arrays of LEDs arranged in a row so that there is a continuous line of several thousand LEDs arranged at 600 LEDs to the inch. The printhead is located adjacent a recording medium, such as an electrophotographic recording medium. Driver chips are provided on the printhead for supplying current to the LEDs in accordance with grey level corrected image data for selectively modulating charge on the medium. In accordance with well known procedures, a latent image is formed on the medium which is then developed with toner and the toned imaged is then transferred to a permanent record member such as plain paper. Alternatively, the recording medium may be photographic film. As noted above, other types of printheads or writers may be used. In this example, the pixel resolution of the printhead operates at 600 dpi in both the cross-track (main scan) and in-track (subscan) directions although the in-track may be a different pixel resolution from the cross-track pixel resolution.

In this example, document pages to be reproduced are scanned by an electronic document page scanner 20 which scans the document, such as document sheets or pages of a book, at a pixel resolution of 400 dpi or pixels per inch in both the cross-track and in-track directions. Such scanners typically comprise an array of light sensitive CCDs (charge-coupled devices) that are situated in a row lying transverse to the direction of relative movement of the document pages past a scanning head that incorporates the CCDs. In some known scanners, the pixel resolution may be say 406 dpi cross-track. In such a case, it is known to interpolate the 406 dpi cross-track data so that the data is reduced to 400 dpi cross-track to facilitate printing with a 400 dpi printhead. The movement of the document page relative to the scan head can also be slowed to 98.5% of normal so that the resulting pixel resolution of the unrendered image data is at 400 dpi both in-track and cross-track. Typically, such a scanner will output grey level unrendered image data at a bit depth of say eight bits/pixel. Where the printhead is a grey level printhead, the data to the printhead will have a grey level for each pixel to be printed defined by at least 2 bits/pixels. The number of bits per pixel to the printhead may increase to provide for nonuniformity correction of the recording elements, in this regard see U.S. Pat. No. 5,300,960 and U.S. application Ser. No. 08/175,079, filed in the name of Ajewole. However, because it is desirable to have storage of the data be as efficient as possible, it is preferred to have the image data represented by a bit depth of only one data bit per pixel. An image processing board 30 may therefore be provided that provides thresholding of the scanned image data in accordance with well known techniques to reduce or render the image data to binary image data; i.e., in which the data is represented by one data bit per pixel. Thus, known circuits or programs are available to generate rendered image data of a single bit per pixel bit depth at a pixel resolution of 400 dpi wherein raw scanned grey level data of the same resolution is input thereto. The image processing board 30 may include in addition to a circuit providing a thresholding operation, other circuits providing, for example, interpolation, gamma correction, error diffusion and color processing in the event that the printer and/or scanner is a color image scanner. These other circuits typically operate before the thresholding operation.

Figure 2:
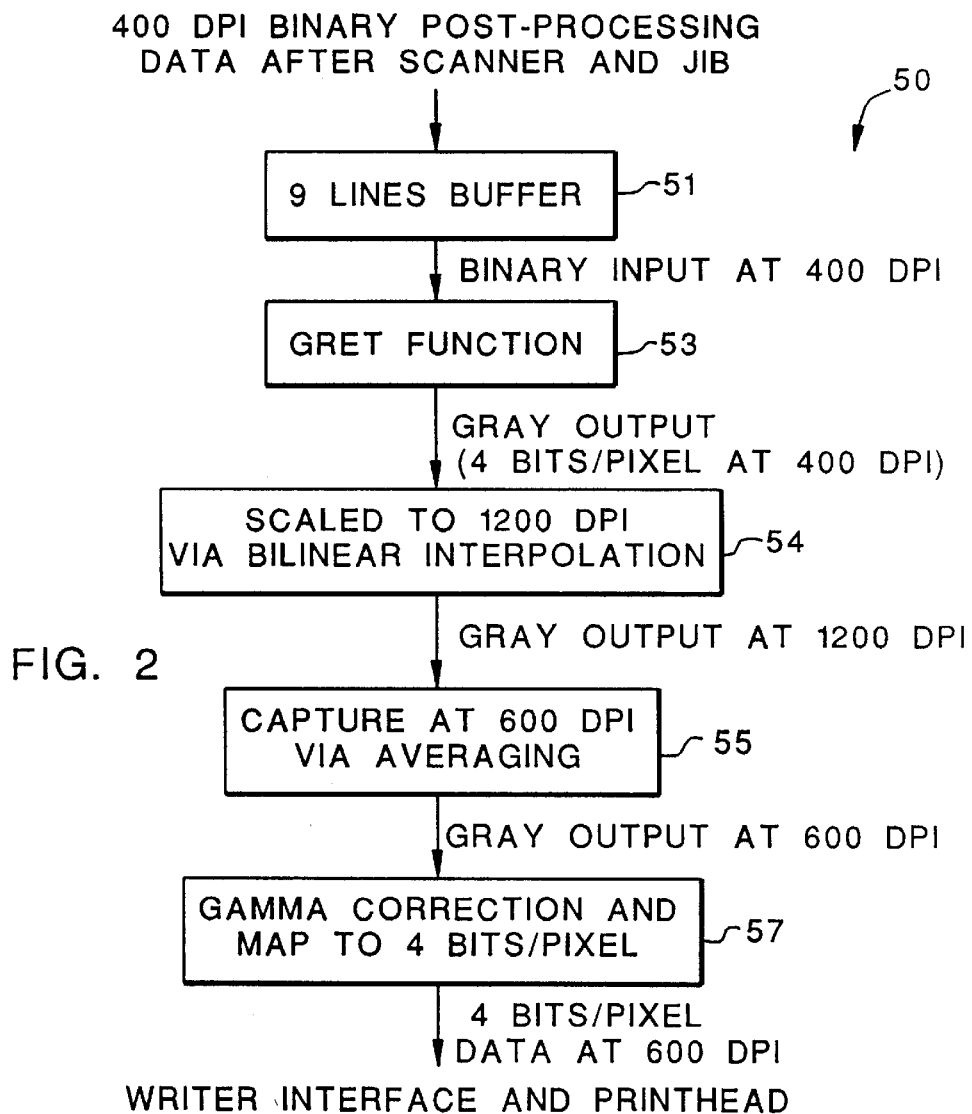
FIG. 2 is a block diagram of a post-processing image enhancement portion of the apparatus of FIG. 1.

The rendered image data of one bit/pixel bit depth is now input into a job image buffer (JIB) 40. An example of a JIB is illustrated in aforementioned U.S. Pat. No. 5,047,955. Such a JIB includes circuitry for compressing the rendered image data so that many pages of the image data may be stored in a buffer memory. The storage of multiple pages of data allows collated copy sets to be made by repeatedly outputting the same image data to the marking engine 70 even though a multi-page document is scanned only once. Upon output of the image data from the JIB's buffer memory, the compressed image data is expanded and output to a post-processing enhancement board 50. Further details of the enhancement board 50 are illustrated in FIG. 2.

Figures 3A, 3B, 3C:
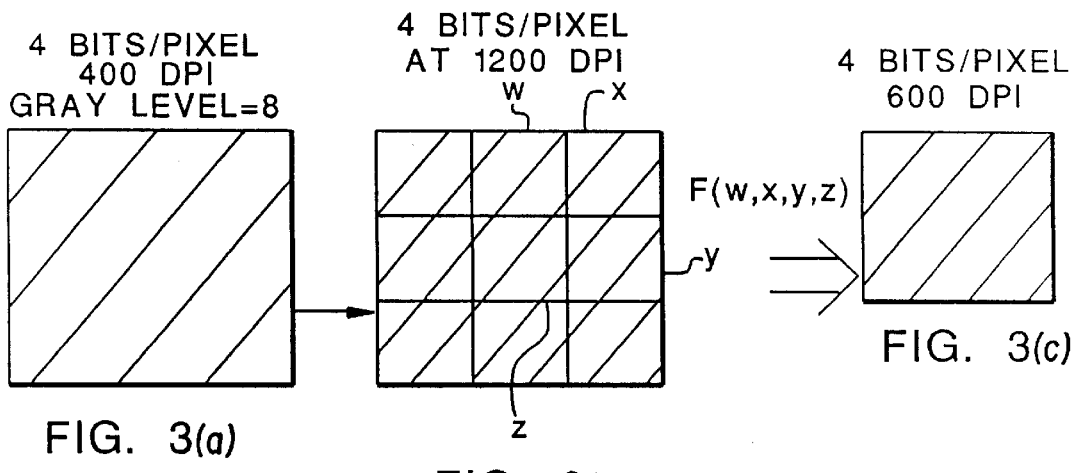
FIGS. 3a–3c is an illustrations of image data being subjected to changes in resolution in accordance with one aspect of the method and apparatus of the invention.

A problem associated with relatively low pixel resolution scanned image data is that, when scanned and then thresholded to a smaller bit depth, image information is lost, particularly at curved edges of characters or where diagonal lines are present. The problem is known as "aliasing" and lines and characters formed are said to have "jaggies." In order to minimize the appearance of jaggies in a print or on a display, it has been long well known to introduce small grey level pixels at certain locations on characters or lines to form smoother characters and/or lines, see for example more recent disclosures in U.S. Pat. No. 5,450,531 and WO 94/13098, the contents of both of which are incorporated herein by reference. In accordance with the particular approach for resolution enhancement described in this aforementioned patent and publication, referred to herein as GRET for grey level resolution enhancement, nine lines of binary image data are stored in a buffer 51. From these nine lines of image data, a GRET ASIC (application specific integrated circuit) 53 may be provided that selects from the buffered data in buffer 51 a 9×9 window of pixels with the center pixel representing a current pixel under consideration for change. Gradient amplitudes and gradient directions of a central sub-window of 3×3 pixel size of the 9×9 window are also generated. Using the data from these three windows, a rotation decision is made for rotating the 9×9 window so as to consider a pattern of a smaller number of the pixels in this window in combination with three gradient amplitude values and five gradient direction values from the respective 3×3 windows. A decision matrix then determines the location of the current pixel, i.e. location relative to a kink site or an end of a line. The use of the rotation and the use of gradient amplitude and direction information allows for far fewer decision comparisons to be provided in the decision matrix. The outputs of the decision matrix is an address to a look-up table (LUT) that provides a grey level pixel defined with say a four bits/pixel bit depth and thus having grey levels typically between 1 and 14 that may be substituted for the binary pixel at that location to provide for smooth character rendition. In operating on the pixels, the binary pixels that are not substituted for may be scaled to be zero and 15 (for binary zero and one, respectively) and thus are also represented by four bits/pixel. As noted above, the binary data with grey level enhanced data is provided at the 400 dpi resolution whereas the printhead pixel resolution is 600 dpi. As used herein the term binary data with grey level enhanced data or GRET data refers to essentially binary data that is enhanced with grey level pixels at strategic locations to minimize jaggies in the printed or displayed image. In accordance with one aspect of the invention, the grey level output pixel is subject to a bi-linear interpolation by a circuit or programmable device or look-up table device 54 wherein each 400 dpi grey level pixel is converted to a 3×3 matrix of nine grey level pixels at a pixel resolution of 1200 dpi. The respective grey levels of these pixels may each be represented by four bits per pixel. This conversion may be through software or a second look-up table. For example, a 400 dpi pixel at grey level 15 (densest pixel) may be represented by nine 1200 dpi pixels, all at grey level 15. A 400 dpi pixel at grey level zero may be represented by nine 1200 dpi pixels at grey level "zero." For conversion of 400 dpi pixels at grey levels one through 14, the nine 1200 dpi grey level pixels substituted for each are assigned grey levels determined heuristically. The nine 1200 dpi pixels need not have the same grey level values due to interpolation and, in fact, it is desirable that some have different grey level values in order to catch some partial dot information to be used when converted to 600 dpi so as to reduce aliasing and may also reduce density contouring when scaling-up from 400 dpi to the 600 dpi output. In FIG. 3(*a*), there is shown a 400 dpi pixel at grey level 8 (of maximum density 15) which is converted as illustrated in FIG. 3(*b*) to 9–1200 dpi pixels each at grey level 8 (of maximum density 15).

After bi-linear interpolation to grey level pixels at the higher 1200 dpi resolution, groups of four adjacent high resolution pixels forming a 2×2 matrix of binary cells, such as pixels w, x, y and z in FIG. 3(*b*), have their grey levels averaged or subjected to some mathematical conversion represented by F(w,x,y,z) to provide an equivalent grey level at four bits/pixel, 600 dpi resolution. Following reduction to 600 dpi in say table 55, the grey level data may be subject to further post-processing. For example, a circuit or programmed device 57 may provide gamma correction at this point if not provided prior to rendering. In gamma correction at the post-processing stage, the gamma corrected output provides for grey level correction at four bits/pixel and provides appropriate correction for this type of marking engine. The mapping may be different for different inputs, i.e. halftoning may receive a different mapping then text type data or pictorial data. This different mapping may be due to compensate for differences in overlapping function of the original 400 dpi input device vs. the 600 dpi output device. Ordinarily, such can be done in the front end scanner image processing board. Thus, 600 dpi, four bits/pixel grey level data is output from the post-processing enhancer 50 to the writer interface 60. The writer interface 60 may include a non-uniformity correction circuit 60*b* to provide for the correction for non-uniformities of the recording elements or LEDs as is known, for example, see U.S. application Ser. No. 08/175,079 and now U.S. Pat. No. 5,666,150 filed in the name of Ajewole. Correction for non-uniformities in this example transforms this data to six bits/pixel, 600 dpi data that is output for recording from non-uniformity correction circuit 60*b* to the printhead of marking engine 70. Prior to non-uniformity correction the data from the scanner may be combined or merged in a merge and buffer circuit 60*b* with data from the RIP.

If the data from the RIP 80 is binary data, the writer interface may also include a circuit 60*c* that provides grey level enhancement of the binary RIP data in accordance with the process described above with regard to circuit 53. However, this enhancement circuit would be operating at 600 dpi. If the RIP data also includes grey level data, this data is not to be subjected to resolution enhancement but in effect bypasses the GRET processor 60*c* and is merged back with the binary data now with grey level enhancement in a sorter 60*d*, which then is corrected for gamma correction (if needed) by a device not shown. The gamma corrected RIP data is then input to the merger and buffer circuit 60*a* and thereafter also corrected for non-uniformity of the recording elements by circuit 60*b*. The merged and/or corrected RIP and/or scanner data is sent to the printhead for recording.

It may thus be seen that the invention provides enhanced data to a high pixel resolution output device wherein the data is input at a relatively lower pixel resolution. Such is accomplished by grey level enhancement of the low resolution binary data which is stored efficiently at the low resolution. The grey level enhanced low pixel resolution binary data is then increased in pixel resolution to the pixel resolution required for printing either using a LUT or algorithm providing a direct transformation or by bi-linear interpolation to a resolution that is N times that of the low resolution (LR). After interpolation to grey level pixels at a resolution of N×(LR) blocks or groups of adjacent pixels at the resolution N×(LR) are averaged to form grey level pixels at resolution M×(LR) wherein N and M are each numbers greater than 1, N is preferably a whole number and N>M.

Modifications to the invention may include combining steps 54 and 55 so effectively 400 dpi binary data with grey level enhanced data is transformed or interpolated into grey level data at 600 dpi. Grey level interpolators are generally known and one example is described in commonly assigned U.S. application Ser. No. 08/469,166, filed in the name of Joseph Ward et al. The particular examples of low and high pixel resolution are merely illustrative and the invention may be used with other values. The invention in its broader aspects is directed to providing grey level enhancement (GRET) of a lower pixel resolution binary file and then interpolating or otherwise transforming the GRETed data to a higher pixel resolution to match that of an output device.

The invention has been described in detail with particular reference to a preferred embodiment thereof, but it will be understood that variations and modifications can be effected within the spirit and scope of the invention.

What is claimed is:

1. An image processing apparatus comprising:
   first means for outputting first binary image data at a relatively low pixel resolution:
   second means for generating grey level enhanced binary image data at the low pixel resolution wherein certain binary pixels are converted to grey level pixels at the low resolution; and
   third means for increasing the pixel resolution of the grey level enhanced binary image data to match the resolution of an output device wherein the grey level enhanced binary image data now includes grey level pixels at a higher resolution than the grey level pixels at the low pixel resolution.

2. The apparatus of claim 1 and wherein the third means includes means for generating high pixel resolution image data from the grey level enhanced binary image data at the low pixel resolution, and means for reducing the high pixel resolution image data to match a resolution of said output device.

3. The apparatus of claim 2 and wherein said first means includes a buffer that stores plural pages of image data in compressed form.

4. The apparatus of claim 1 and wherein said first means includes a buffer that stores plural pages of image data in compressed form.

5. An image processing method comprising:
   providing first binary image data at a relatively low pixel resolution;
   generating grey level enhanced binary image data at the low pixel resolution wherein certain binary pixels are converted to grey level pixels at the low resolution; and
   increasing the resolution of the grey level enhanced image data to match that of an output device wherein the grey level enhanced binary image data now includes grey level pixels at a higher resolution than the grey level pixels at the low pixel resolution.

6. The method of claim 5 including generating high resolution image data from the grey level enhanced binary image data at the low pixel resolution and reducing the high resolution image data to match a resolution of said output device.

7. The method of claim 6 including storing plural pages of binary image data in compressed form in a buffer, and repeatedly outputting the same data from the buffer to generate the first binary image data.

8. The method of claim 5 including storing plural pages of binary image data in compressed form in a buffer, and repeatedly outputting the same data from the buffer to generate the first binary image data.

9. The method of claim 8 including generating gradient amplitude values and gradient direction values and using said values to determine if a binary pixel is to be modified to a grey value pixel to reduce jaggies in an image to be formed from the first binary image data.

10. The method of claim 6 including generating gradient amplitude values and gradient direction values and using said values to determine if a binary pixel is to be modified to a grey value pixel to reduce jaggies in an image to be formed from the first binary image data.

11. The method of claim 5 including generating gradient amplitude values and gradient direction values and using said values to determine if a binary pixel is to be modified to a grey value pixel to reduce jaggies in an image to be formed from the first binary image data.

12. The method of claim 5 and including outputting grey level enhanced binary image data that includes grey level pixels at the higher resolution to the output device; and operating the output device and printing the grey level enhanced binary image data that includes grey level pixels at the higher resolution to form an image.

13. An image processing apparatus comprising:

a data store that stores and outputs first binary image data at a relatively low pixel resolution:

a resolution enhancement generator that generates grey level enhanced binary image data at the low pixel resolution wherein certain binary pixels are converted to grey level pixels at the low resolution; and a resolution increasing device that increases the pixel resolution of the grey level enhanced binary image data to match the resolution of an output device wherein the grey level enhanced binary image data now includes grey level pixels at a higher resolution than the grey level pixels at the low pixel resolution.

* * * * *